United States Patent
Hernández Palmero et al.

(10) Patent No.: US 12,309,596 B2
(45) Date of Patent: May 20, 2025

(54) SYSTEM FOR THE INSPECTION, EVALUATION AND DIAGNOSIS OF THE LEVEL OF CYBERSECURITY OF A VEHICLE

(71) Applicant: EUROCYBCAR, S.L., Miñano (ES)

(72) Inventors: María Azucena Hernández Palmero, Tres Cantos (ES); José Guerreira Velicia, Tres Cantos (ES)

(73) Assignee: EUROCYBCAR, S.L, Miñano (ES)

( * ) Notice: Subject to any disclaimer, the term of this patent is extended or adjusted under 35 U.S.C. 154(b) by 343 days.

(21) Appl. No.: 17/773,844

(22) PCT Filed: Nov. 8, 2019

(86) PCT No.: PCT/ES2019/070763
§ 371 (c)(1),
(2) Date: May 3, 2022

(87) PCT Pub. No.: WO2021/089890
PCT Pub. Date: May 14, 2021

(65) Prior Publication Data
US 2022/0400382 A1    Dec. 15, 2022

(51) Int. Cl.
*H04W 4/40*   (2018.01)
*H04L 9/40*   (2022.01)
*H04W 12/30*  (2021.01)

(52) U.S. Cl.
CPC ......... *H04W 12/30* (2021.01); *H04L 63/1433* (2013.01); *H04W 4/40* (2018.02)

(58) Field of Classification Search
CPC .................................................. H04W 12/30

USPC ......................................................... 455/410
See application file for complete search history.

(56) References Cited

U.S. PATENT DOCUMENTS

| | | | |
|---|---|---|---|
| 10,764,134 B2 * | 9/2020 | Barrett ..................... | H04L 41/12 |
| 10,814,833 B1 * | 10/2020 | Goetzinger ............. | B60R 25/23 |
| 2020/0067956 A1 * | 2/2020 | Hartkopp .............. | G06F 11/349 |

FOREIGN PATENT DOCUMENTS

| | | |
|---|---|---|
| EP | 3370389 | 9/2018 |
| WO | WO 2019/023565 | 1/2019 |

OTHER PUBLICATIONS

International Search Report and the Written Opinion Dated Jul. 7, 2020 From the International Searching Authority Re. Application No. PCT/ES2019/070763. (14 Pages).
D'Abreu et al. "Automotive EMC Testing: CISPR 25, ISO 11452-2 and Equivalent Standards. EMC Standards and Chamber Testing for Automotive Components", In Compliance Magazine, XP055708918, p. 20-33, Feb. 1, 2016.

* cited by examiner

*Primary Examiner* — Qutbuddin Ghulamali

(57) ABSTRACT

A system for the inspection, evaluation and diagnosis of the level of cybersecurity of a vehicle, in particular for electronically managed devices and/or systems, comprising a control server provided with software and data communication means configured for data exchange between the software and the electronic devices present in the vehicle, such that the control server determines the existence or absence of situations of data manipulation based on the data coming from the electronic devices.

14 Claims, 1 Drawing Sheet

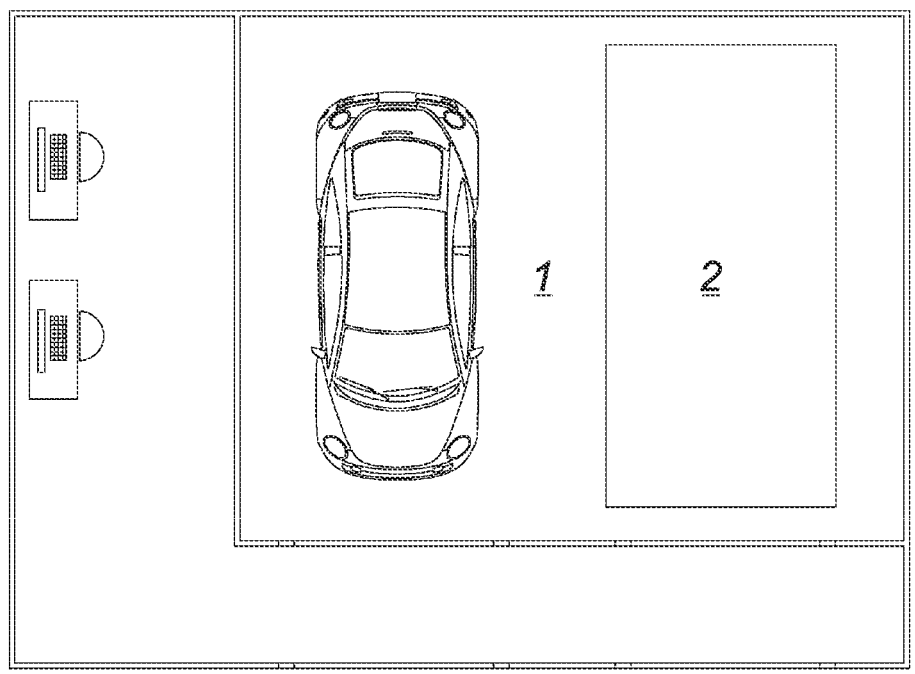

SYSTEM FOR THE INSPECTION, EVALUATION AND DIAGNOSIS OF THE LEVEL OF CYBERSECURITY OF A VEHICLE

RELATED APPLICATIONS

This application is a National Phase of PCT Patent Application No. PCT/ES2019/070763 having International filing date of Nov. 8, 2019. The contents of the above application is incorporated by reference as if fully set forth herein in its entirety.

FIELD AND BACKGROUND OF THE INVENTION

The object of the present application is to provide a system for the inspection, evaluation and diagnosis of the level of cybersecurity of a vehicle.

More specifically, the invention proposes the development of a system for the inspection, evaluation and diagnosis of the level of cybersecurity of a vehicle such as, for example, an automobile, which allows evaluating the degree of security in the event of a possible attack on the electronic systems installed in a vehicle, which may put at risk the privacy—data—and life of its occupants or even of other users.

Vehicles circulating on roads today include a large number of devices which are electronically actuated and managed such as, for example, the electronic control unit (ECU), airbags, central locking of doors, windows, etc., which can be managed by cable-type connection means or remotely, for example, for maintenance tasks, repairs and/or control for the correct operation thereof.

Likewise, the vehicles today have another large number of electronic devices with different applications for users such as: GPS (vehicle positioning), Bluetooth (having telephone conversations while driving the vehicle), USB ports (connection for electronic devices), WiFi ports (to enable a connection to the Internet), etc.

Both those devices which are electronically actuated and managed and those other electronic type devices in the vehicle are subject to being manipulated or "hacked" by third parties, with the subsequent risk or danger such manipulation can entail for the occupants in the vehicle.

Thus, for example, in relation to the ECU of a vehicle, there is a risk of a third party being able to remotely access the unit and to order the airbags to be deployed when no such need exists, putting the physical safety of the users on the road on which said vehicle is circulating at risk.

In the case of a GPS device, there may also be a risk of a third party being able to access the exact stored positions of the vehicle, thus being able to obtain the routine movements made by the user of the vehicle to try to blackmail or even kidnap said user.

The same problem would exist with the Bluetooth or WiFi ports of a vehicle, which could be a source of access by a third party to telephone conversations or the personal data of the users of the vehicle.

Another source of danger would be that derived from the current digital systems for opening vehicles (Keyless Access) whereby the user does not need to introduce the key into the vehicle lock or electrical contact because by simply bringing said key closer to the vehicle or electrical contact the door opens or the engine starts, respectively.

For systems of this type, the main risk associated with its use is that a third party may access the vehicle by means of digital duplicates.

Furthermore, it is essential for the applications or programs that the user of a vehicle downloads to be able to access information or even allow the user to activate functions remotely in the vehicle, to be capable of preventing or hindering unauthorized third party access to the vehicle or the private information of the user.

It is therefore absolutely necessary to reduce and palliate these dangers and risks, particularly because they may sometimes affect people's lives.

SUMMARY OF THE INVENTION

The present invention has been developed for the purpose of providing a system for the inspection, evaluation and diagnosis of the level of cybersecurity of a vehicle which is configured as a novelty within the field of application.

It is therefore an object of the present invention to provide a system for the inspection, evaluation and diagnosis of the level of cybersecurity of a vehicle, in particular for devices, systems and applications which have a software or hardware susceptible to being acted on by a third party.

This system preferably comprises a control server provided with software and data communication means configured for data exchange between the software and electronic devices present in the vehicle, such that the control server determines the existence or absence of situations of data manipulation based on the data coming from the electronic devices.

This system for the inspection, evaluation and diagnosis is intended, as discussed, for evaluating the level of cybersecurity of the electronically managed devices, systems and/or applications of a vehicle, namely those which correspond with a physical access (for example: can bus, ECU, USB, EDR, etc.), those which correspond with a remote access (keyless system, WiFi ports, Bluetooth devices, ECALL dialing devices, NFC devices, RDS, TPMS systems, GPS, etc.) as well as computer applications (APP), any other multimedia content or any driving aid system incorporated in the vehicle.

Therefore, the purpose of this system is to enable evaluating the level of cybersecurity of any of the electronic devices in a vehicle and of the digital applications it has.

It must be pointed out that the term vehicle refers to any manned or unmanned device configured for transporting people and/or goods, said definition including, but not limited to, the following: bicycles, scooters, mopeds, automobiles, motorcycles, trucks, tractors, buses, trains, trams, drones, aircraft, ships, etc.

With regard to the software, said software comprises a series of executable instructions to enable evaluating the level of vulnerability of an electronic device against either direct or indirect third party attacks. Preferably, said instructions are adapted to security standards, protocols or audits such as: OSSTMM, OWASP, CVSS, etc.

Namely, said software interacts with the electronic devices and/or digital applications existing in the vehicle and in respect of which the level of cybersecurity must be assessed to enable determining their level of protection against third party attacks.

In a preferred embodiment, the data communication means are of the wired type by means of a physical connection socket.

Alternatively, the aforementioned data communication means can be of the wireless type or combined with means of the wired type.

An additional object of the invention relates to a method for the inspection, evaluation and diagnosis of the level of cybersecurity of electronically managed devices and/or systems present in a vehicle comprising the following steps:

acquiring and analysing data coming from electronically managed devices and/or systems;

generating parameters associated with the degree of cybersecurity from the data coming from electronically managed devices and/or systems;

evaluating the related degree of cybersecurity from the obtained parameters; and establishing an assessment—cyber rating—based on the set of results of the evaluation.

In a preferred embodiment, the generation of parameters associated with the degree of cybersecurity from the data coming from electronically managed devices and/or systems is performed by means of software housed in a control server.

Preferably, to evaluate the degree of cybersecurity, in addition to assessing the mentioned parameters, a series of consequences for said parameters can be associated. Thus, for example, for the parameter consisting of ECU vulnerability, if a series of errors in essential communications is detected, the existence of a risk of remote manipulation by a third party of the action of the airbags can be associated as a consequence.

In another preferred embodiment, to evaluate the degree of cybersecurity, a series of associated recommendations can furthermore be established for each of the analysed parameters. Thus, for example, continuing with the parameter consisting of ECU vulnerability, if a series of errors in essential communications are detected, the recommendation may consist of updating the ECU software.

To evaluate the degree of cybersecurity, a series of positive points of each parameter can also be set. Thus, for example, continuing with the parameter consisting of ECU vulnerability, they could be referenced as positive points offering a rapid execution of instructions.

From each of these variables, evaluation of parameters and/or consequences associated with the parameters and/or recommendations and/or positive points, the global level of cybersecurity of the vehicle—cyber rating—is determined, which allows establishing a comparison between the level of cybersecurity of the evaluated vehicle and other vehicles.

As mentioned above, the purpose of this method is to obtain a global level of cybersecurity of the vehicle which will allow having an effect on at least the physical safety of the occupants of the vehicle and of other users of the roads on which the vehicle circulates, on the privacy of the personal data of the occupants, on the performance of vehicle functions, on compliance with the corresponding legal regulations (for example: at the data protection level) and on the correct adaptation of the vehicle to the needs of the driver and its users.

It is also another object of the invention to provide an installation for applying the system for the inspection, evaluation and diagnosis described above, comprising at least one Faraday cage structure with dimensions suitable for placing a vehicle therein. Tests can thus be conducted on the wireless communication systems of the vehicle without interference from or with the exterior that may alter the result of the tests performed.

In a preferred embodiment, the installation and/or the Faraday cage structure has a polygonal-shaped floor plan and more preferably, one of the rectangular type. Preferably, for the case of a rectangular-type floor plan, the dimensions thereof are about 500 cm long and 350 cm wide.

In another preferred embodiment, the installation can be configured to receive more than one vehicle and to have more than one system for the inspection, evaluation and diagnosis according to the invention such that the level of cybersecurity of the electronic devices of more than one vehicle can be checked at the same time.

As a result of these features, it is possible to detect the degree of security in the event of undue manipulation by third parties of electronic or telematic systems which act in the operation of a vehicle, identifying vulnerabilities, which thus allows increasing or improving the degree of cybersecurity thereof.

The described system therefore represents an innovative structure having structural and constitutive features that have been unknown up until now for the purpose for which it is intended, and these reasons combined with its practical usefulness—even when establishing a comparison between vehicles—provide it with sufficient grounds to obtain the exclusive privilege which is being sought.

Other features and advantages of the system for the inspection, evaluation and diagnosis of the level of cybersecurity of a vehicle object of the present invention will become apparent from the description of a preferred but not exclusive embodiment illustrated by way of non-limiting example in the attached drawings, in which:

BRIEF DESCRIPTION OF THE SEVERAL VIEWS OF THE DRAWINGS

FIG. 1 is a schematic view of an installation envisaged for applying the system according to the invention.

DESCRIPTION OF SPECIFIC EMBODIMENTS OF THE INVENTION

In view of the mentioned figures, and according to the numbering used, a preferred embodiment of the invention can be seen in said figures, comprising the parts and elements indicated and described in detail below.

The system for the inspection, evaluation and diagnosis of the level of cybersecurity of a vehicle, in particular for devices, applications and/or systems susceptible to being acted on by a third party, comprises a control server provided with software and data communication means configured for data exchange between the software and the devices, applications and/or systems susceptible to being acted on by a third party, such that the control server determines the existence or absence of situations of data manipulation based on the data coming from the devices, applications and/or systems susceptible to being acted on by a third party.

With regard to the data communication means, they can be of the wired type by means of a physical connection socket and/or of the wireless type.

This system involves a method for the inspection, evaluation and diagnosis of the level of cybersecurity of devices, applications and/or systems susceptible to being acted on by a third party present in the vehicle comprising the steps of:

acquiring and analysing data coming from the devices, applications and/or systems susceptible to being acted on by third parties;

generating parameters associated with the degree of cybersecurity from the data coming from the devices, applications and/or systems susceptible to being acted on by third parties;

evaluating the related degree of cybersecurity from the obtained parameters, in which different degrees of cybersecurity are previously established to evaluate the degree of security of the vehicle; and establishing an assessment—cyber rating—based on the set of results of the evaluation.

In a preferred embodiment of the invention, the generation of the parameters associated with the degree of cybersecurity is performed by means of software housed in a control server.

Among other reference elements for establishing the score, or cyber rating, the final assessment will take into account five established levels of cybersecurity:

Minor risk level (maximum level of security): this level would be assigned for cases where minor errors that do not involve any danger for passengers, their privacy and/or the car are detected;

Low risk level (high level of security): this level means that a third party could have access to personal information stored in electronic devices or multimedia systems but not involving a risk for passengers;

Medium risk level (medium level of security): this level would be assigned for those cases in which electronic devices or multimedia systems can be the object of minor remote attacks or serious attacks after accessing the interior of the vehicle;

High risk level (low level of security): this level would correspond with cases in which a third party could easily open the doors of a car, subsequently accessing the ECU to start the engine and/or manipulate parameters and elements which may put the safety of the driver and passengers at risk; and Critical risk level (critical level of security): this level would be assigned when it is detected that a third party can carry out attacks remotely, which may affect the safety of the driver and passengers (for example: access to the ECU through WiFi or attacks from the Internet in the event that the car has a SIM).

Together with the levels set forth above, other security parameters of the vehicle obtained through vehicle testing systems and mechanisms and/or through software based on artificial intelligence could also be taken into account to check that any of the mentioned parameters comply with regulations.

The system described above can be carried out in installations having different areas or rooms, where there can be at least one room for the vehicles (1) and a Faraday cage structure (2) with dimensions suitable for placing a vehicle therein, as schematically depicted in FIG. 1.

What is claimed is:

1. A system for evaluating cybersecurity of a vehicle, comprising:
a control server provided with software and data communication means configured for data exchange between the software and electronic devices present in the vehicle using data communication means selected from a group consisting of a physical connection socket and data communication means of a wireless type;
wherein the control server is configured to:
acquire and analyze data from the electronic devices in the vehicle;
generate cybersecurity parameters based on the analyzed data;
evaluate a global level of cybersecurity protection against third party attacks for the vehicle based on the generated cybersecurity parameters; and
establish an overall cyber rating for the vehicle based on the evaluated global level of cybersecurity protection; and
establish a comparison between a cybersecurity level of the evaluated vehicle and a cybersecurity level of other vehicles using the overall cyber rating.

2. An installation for a system for the inspection, evaluation and diagnosis according to claim 1, comprising a Faraday cage structure with dimensions suitable for placing a vehicle therein.

3. An installation for a system for the inspection, evaluation and diagnosis according to claim 1, comprising a Faraday cage structure with dimensions suitable for placing a vehicle therein.

4. An installation for a system for the inspection, evaluation and diagnosis according to claim 1, comprising a Faraday cage structure with dimensions suitable for placing a vehicle therein.

5. The system of claim 1, wherein the control server is further configured to:
establish a risk level classification for the cybersecurity rating selected from:
minor risk level indicating maximum security;
low risk level indicating high security;
medium risk level indicating medium security;
high risk level indicating low security; and
critical risk level indicating critical security.

6. The system of claim 1, wherein evaluating the global level of cybersecurity protection comprises:
analyzing parameters related to at least one of:
physical safety of vehicle occupants;
privacy of personal data;
vehicle function performance;
compliance with legal regulations; and
adaptation of the vehicle to driver needs.

7. The system of claim 1, wherein generating cybersecurity parameters comprises:
evaluating vulnerability of electronic devices selected from:
physical access devices comprising CAN bus, ECU, USB, and EDR; and
remote access devices comprising keyless systems, WiFi ports, Bluetooth devices, ECALL devices, NFC devices, RDS, TPMS systems, and GPS.

8. The system of claim 1, wherein the control server is further configured to:
associate consequences with the generated cybersecurity parameters;
establish recommendations for improving cybersecurity based on the parameters; and
identify positive security aspects for each parameter.

9. The system of claim 1, wherein the software comprises executable instructions adapted to security standards selected from OSSTMM, OWASP, and CVSS protocols.

10. The system of claim 1, wherein the data communication means comprises at least one of:
wired communication through a physical connection socket; and
wireless communication.

11. A method for the inspection, evaluation and diagnosis of the level of cybersecurity of electronically managed devices and/or systems present in a vehicle comprising the steps of:
acquiring and analysing data coming from electronically managed devices and/or systems;

generating parameters associated with the global level of cybersecurity protection from the data coming from electronically managed devices and/or systems;

performing one or more cybersecurity evaluation tests on the electronically managed devices and/or systems; and evaluating the global level of cybersecurity protection from the obtained parameters based on results of the one or more performed cybersecurity evaluation tests.

12. The method according to the claim 11, wherein the generation of parameters associated with the global level of cybersecurity protection is performed by means of software housed in a control server.

13. The method according to claim 12, further comprising an assessment step based on the set of results of all the one or more performed cybersecurity evaluation tests performed.

14. The method according to claim 11, further comprising an assessment step based on a set of results of the one or more performed cybersecurity evaluation tests performed.

* * * * *